(12) United States Patent
McKenzie et al.

(10) Patent No.: US 6,412,790 B2
(45) Date of Patent: Jul. 2, 2002

(54) VEHICLE SUSPENSION AND ROTARY HEIGHT CONTROL VALVE FOR SAME

(75) Inventors: Thomas A. McKenzie, Spring Lake; Richard L. Conaway, Grand Haven, both of MI (US)

(73) Assignee: Holland Neway International, Inc., Muskegon, MI (US)

(*) Notice: Subject to any disclaimer, the term of this patent is extended or adjusted under 35 U.S.C. 154(b) by 0 days.

(21) Appl. No.: 09/796,187

(22) Filed: Feb. 28, 2001

Related U.S. Application Data

(63) Continuation-in-part of application No. PCT/US99/19932, filed on Aug. 30, 1999, now abandoned.
(60) Provisional application No. 60/098,491, filed on Aug. 31, 1998.

(51) Int. Cl.[7] ...................... B60G 17/052; B60G 17/056
(52) U.S. Cl. ................ 280/6.159; 280/124.16; 137/625.22
(58) Field of Search .................... 280/6.159, 6.158, 280/6.157, 6.16, 124.16, 5.514; 267/64.16; 137/625.22

(56) References Cited

U.S. PATENT DOCUMENTS

| | | |
|---|---|---|
| 2,621,886 A | 12/1952 | Mueller |
| 2,631,002 A | 3/1953 | Mueller |
| 2,790,650 A | 4/1957 | Boschi |
| 2,905,430 A | 9/1959 | Deist |
| 3,159,378 A | 12/1964 | Haag |
| 3,598,423 A | 8/1971 | Clarenbach |
| 3,985,155 A | 10/1976 | Nightingale |
| 3,993,099 A * | 11/1976 | Nightingale ........... 137/625.46 |
| 4,980,073 A | 12/1990 | Woodruff |
| 5,152,321 A | 10/1992 | Drager et al. |
| 5,161,579 A | 11/1992 | Anderson, Jr. |
| 5,207,246 A | 5/1993 | Meyer |
| 5,560,591 A | 10/1996 | Trudeau et al. |

FOREIGN PATENT DOCUMENTS

EP      0 154 308     * 9/1985

* cited by examiner

Primary Examiner—Peter C. English
(74) Attorney, Agent, or Firm—St. Onge Steward Johnston & Reens LLC

(57) ABSTRACT

A height control valve is preferably adapted to be mounted in a trailing arm suspension and fluidly interconnected to a source of pressurized air and to an air spring. The height control valve comprises a housing having a cylindrical bore, a supply port, an exhaust port and an air spring port each of which extends through the housing and fluidly communicates with the bore. A rotor is preferably rotatably mounted in the bore and interconnected to the arm wherein pivotal movement of the arm rotates the rotor with respect to the housing between first, second and third rotational positions. A plurality of seals is preferably located between the rotor and the bore defining a flow passage between the bore and the rotor wherein in the first rotational position, the flow passage isolates the air spring port from both the supply port and the exhaust port, in the second rotational position the flow passage interconnects the air spring port with the supply port, and in the third rotational position the flow passage interconnects the air spring port with the exhaust port.

22 Claims, 5 Drawing Sheets

VEHICLE SUSPENSION AND ROTARY HEIGHT CONTROL VALVE FOR SAME

CROSS-REFERENCE TO RELATED APPLICATIONS

This application is a continuation-in-part of International Application No. PCT/US99/19932, filed Aug. 30, 1999, now abandoned, which claims the benefit of U.S. Provisional Patent Application Ser. No. 60/098,491, filed on Aug. 31, 1998.

BACKGROUND OF THE INVENTION

1. Field of the Invention

The invention relates to a vehicle suspension in which the height of one or more axles is controlled with a height control valve which inflates one or more air springs mounted between the vehicle frame and the axle and, more specifically, to a vehicle suspension having a rotary height control valve. The height control valve can also be used to control the height of a vehicle cab relative to the vehicle frame when air springs support the cab.

2. Related Art

Pneumatic vehicle suspensions often have a leveling device for controlling the height of a vehicle frame relative to a vehicle axle. This leveling device, often called a height control valve, controls the amount of air within an air spring located between the frame and the axle. The height control valve typically controls the air pressure in the air spring in response to changes in the distance between the frame and the axle by selectively interconnecting the air spring with a supply of pressurized air or an exhaust port. The height control valve has its greatest use in maintaining a constant level of a vehicle chassis or frame relative to its axles in response to the loading and unloading of the vehicle, often referred to as the "ride height" of the vehicle.

FIG. 1 illustrates a typical prior art height control valve 10 mounted on a frame 12 of a vehicle by bolts 14. The valve 10 is adapted to supply air to an air spring 22 which is mounted between the frame 12 and an axle support 24, such as a trailing arm, so that the upward and downward movement of the frame 12 relative to the axle support 24 actuates the height control valve 10 to normally exhaust air from or deliver air to the air spring 22.

Air is typically supplied from a source of pressurized air such as a tank 26 by a supply tube 28 connected to an inlet port 30 of the height control valve 10. The air is delivered to the air spring 22 through a delivery tube 32, which is connected to a delivery port 34 of the height control valve 10. Air is exhausted from the air spring by an exhaust tube 36 connected to an exhaust port 40 and is vented to the atmosphere as shown in FIG. 1. An actuator arm 42 extends from the height control valve 10 and is connected to a linkage 44 extending between the axle support 24 and the vehicle frame 12. In operation, movements of the axle support 24 relative to the frame 12 pivot the actuator arm 42 through the linkage 44 to control the height control valve 10.

Height control valves for vehicles, though known for years, remain problematic. Problems include a large number of parts leading to high assembly and service costs. Seal wear presents a further problem with prior height control valves due to the repetitive motion intrinsic to the operation.

SUMMARY OF THE INVENTION

The invention relates to a trailing arm suspension comprising a frame bracket adapted to be mounted to a vehicle frame, a trailing arm pivotally mounted to the frame bracket, and an air spring mounted on the trailing arm and adapted to be mounted to the underside of the vehicle frame. A height control valve is adapted to be fluidly interconnected to a source of pressurized air and to the air spring and has an arm adapted to be connected to the trailing arm to control the flow of pressurized air to the air spring and the exhaust of pressurized air therefrom in response to pivotal movement of the trailing arm with respect to the vehicle frame.

According to the invention, the height control valve comprises a housing having a cylindrical bore, a supply port, an exhaust port and an air spring port each of which extends through the housing and fluidly communicates with the bore. A rotor is rotatably mounted in the bore and interconnected to the arm wherein pivotal movement of the arm rotates the rotor with respect to the housing between first, second and third rotational positions. A plurality of seals is located between the rotor and the bore defining a flow passage between the bore and the rotor wherein in the first rotational position, the flow passage isolates the air spring port from both the supply port and the exhaust port, in the second rotational position the flow passage interconnects the air spring port with the supply port, and in the third rotational position the flow passage interconnects the air spring port with the exhaust port.

The flow passage is preferably defined by a pair of circumferential seals. The rotor preferably has a longitudinal axis and the flow passage is inclined at an acute angle with respect to the longitudinal axis. The seals preferably comprise a circumferential seal located at each end of the rotor. The seals are preferably o-rings. The rotor of the height control valve can have a plurality of circumferential grooves, each of which receives an o-ring seal.

The seals can be configured so as to provide a dead band for the suspension, wherein small movements of the axle relative to the frame are attenuated. The configuration of the seals and the position of the ports can cooperate to define a characteristic flow rate of the valve.

Other objects, features, and advantages of the invention will be apparent from the ensuing description in conjunction with the accompanying drawings.

BRIEF DESCRIPTION OF THE DRAWINGS

The invention will be described with reference to the accompanying drawings in which.

DETAILED DESCRIPTION OF THE PREFERRED EMBODIMENTS

Figure 1:
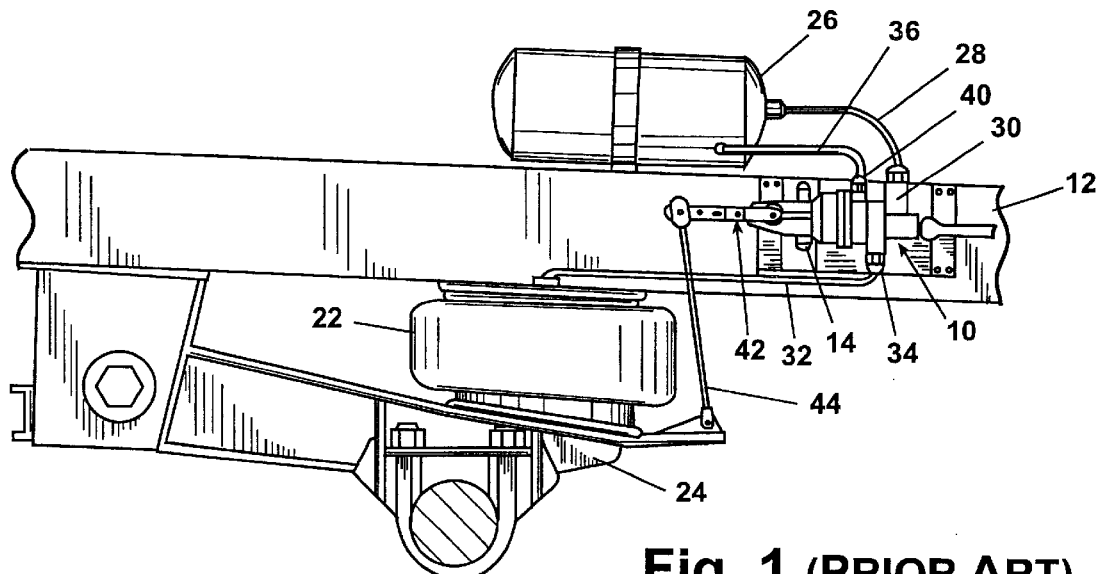
FIG. 1 is a side elevational view of a prior art vehicle suspension comprising a trailing arm pivotally mounted to a vehicle frame and supported relative to the vehicle frame by an air spring pressurized by a prior art height control valve responsive to changes in the vertical distance between the vehicle frame and a trailing arm.
Figure 2:
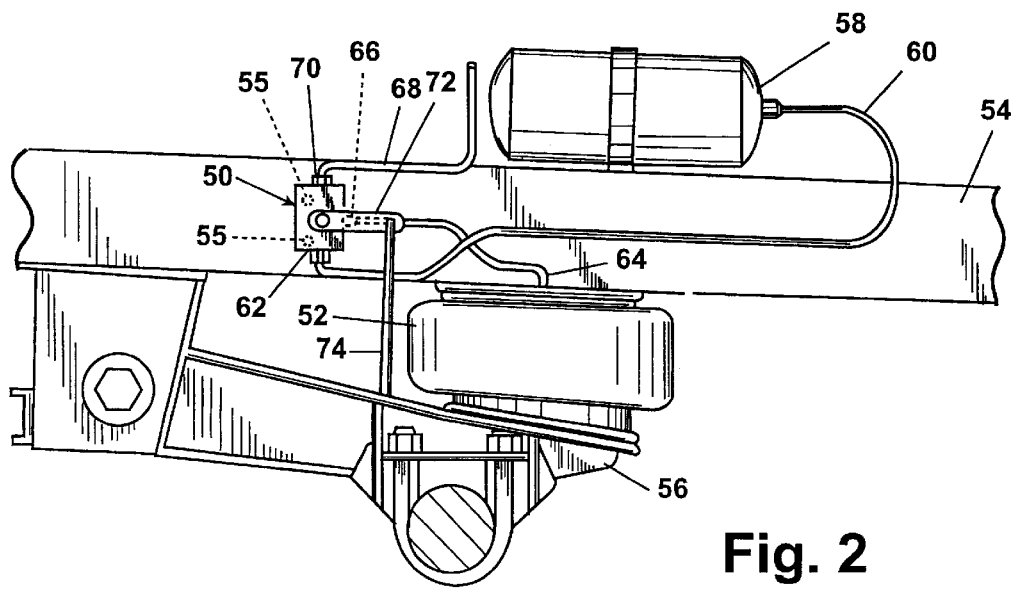
FIG. 2 is a side elevational view of a vehicle suspension having a rotary height control valve according to the invention.

FIG. 2 illustrates a height control valve 50, according to the invention, mounted on a frame 54 of a vehicle by bolts 55. The height control valve 50 is adapted to supply air to an air spring 52 which is mounted between the frame 54 and an axle support 56, such as a trailing arm, so that upward and downward movement of the frame 54 relative to the axle support 56 actuates the height control valve 50 to either exhaust air from or deliver air to the air spring 52.

As shown in FIG. 2, pressurized air is supplied by a tank 58 via a supply tube 60, which is connected to a supply port 62 of the height control valve 50. The air is selectively delivered to the air spring 52 through a delivery tube 64, which is connected to an air spring port 66 of the height control valve 50. Air is exhausted from the air spring 52 by an exhaust port 70 of the height control valve 50, and is vented to the atmosphere via an exhaust tube 68 as shown in FIG. 2.

As shown in FIG. 2, a lever 72 extends from the height control valve 50 and is connected to a linkage 74 extending between the axle support 56 and the height control valve 50. In operation, movement of the axle support 56 relative to the frame 54 pivots the lever 72 through the linkage 74 to actuate the height control valve 50 and thereby dispense air to or exhaust air from the air spring 52 by selectively interconnecting the air spring port 66 with the supply and exhaust ports 62 and 70, respectively.

Figure 3:
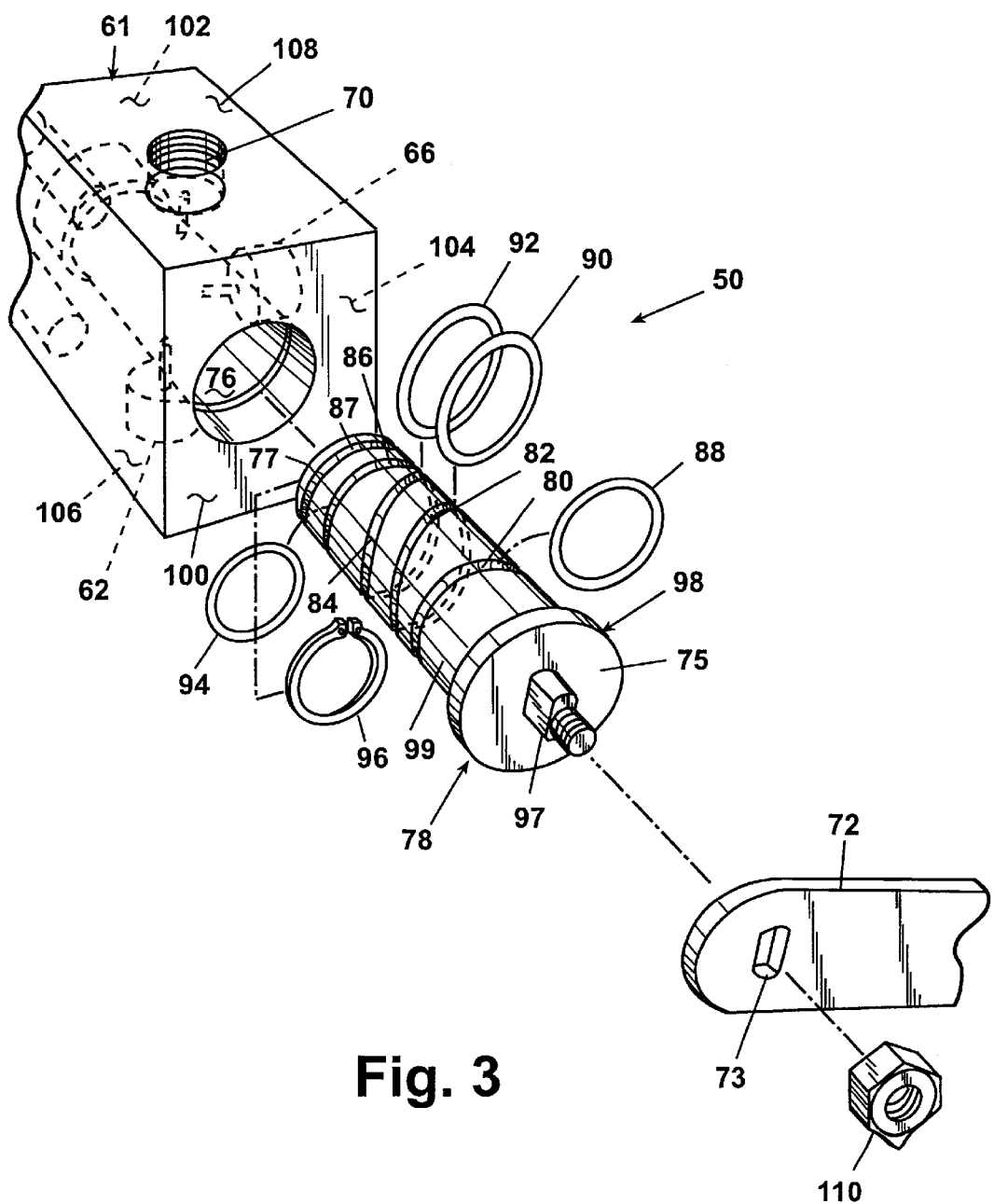
FIG. 3 is an exploded perspective view of the height control valve of FIG. 2 with the remaining elements of the vehicle suspension removed for clarity.

As shown in FIG. 3, the height control valve 50 comprises a housing 61 having the three radially-spaced supply, air spring, and exhaust ports 62, 66, and 70, respectively, communicating with a common cylindrical bore 76, which extends the length of the housing 61. Although the housing 61 is shown as being cubic in shape, any appropriately configured three-dimensional member will suffice.

Each port comprises a socket threaded to receive a conventional air hose and a coaxial conduit of smaller diameter, which communicates with the bore 76 of the housing 61 in the orientation shown in the drawings. The air spring port 66 is preferably centrally located on a right-hand face 104 of the housing 61. The supply port 62 is located on a bottom face 106 of the housing 61 closer to a rear face 102 of the housing 61 than the air spring port 66. The exhaust port 70 is located on a top face 108 of the housing 61 closer to a front face 100 of the housing 61 than the air spring port 66.

The height control valve 50 further comprises a cylindrical rotor 78 having a diameter slightly less than that of the cylindrical bore 76 of the housing 61. The rotor 78 further comprises, circumferentially and in the following axial sequence from a first end 75 to a second end 77 of the rotor 78, a first normal circumferential groove 80, a first inclined circumferential groove 82, a second inclined circumferential groove 84, a second normal circumferential groove 86, and a third normal circumferential groove 87. O-rings 88 and 94 are provided to fit into the first and second normal grooves 80 and 86, respectively. O-rings 90 and 92 are provided to fit into the first and second inclined grooves 82 and 84, respectively. A circular retaining ring 96 is provided which fits into the third normal groove 87 after the rotor 78 has been inserted within the cylindrical bore 76 of the housing 61 and has a diameter larger than the bore 76 to prevent the withdrawal of the rotor 78 therefrom.

The height control valve rotor 78 has a flange section 98 that interfaces with surface 100 of valve body 61. When installed, flange 98 and retaining ring 96 prevent rotor 78 from axial motion in bore 76 of valve body 61.

The grooves 80–86 of the rotor 78 are preferably provided with a depth less than that of a cross-sectional height of their corresponding o-rings 88–94 so that, when the o-rings 88–94 are positioned in their respective grooves 80–86, the o-rings 88–94 extend slightly beyond an outer surface 99 of the rotor 78. The portion of the o-rings 88–94 extending beyond the outer surface of the rotor 78 define a first annular gap 112 between the o-ring 88 in the first normal groove 80 and the o-ring 90 in the first inclined groove 82, a second annular gap 114 between the o-ring 90 in the first inclined groove 82 and the o-ring 92 in the second inclined groove 84, and a third annular gap 116 between the o-ring 92 in the second inclined groove 84 and the o-ring 94 in the second normal groove 86. Each of the first, second, and third annular gaps 112, 114, and 116, respectively, are bordered on an inner and outer radial limit by the outer surface of the rotor 78 and the inner surface of the bore 76, respectively.

To assemble the height control valve 50, o-rings 88 and 94 are secured within the first and second normal grooves 80 and 86, respectively, of the rotor 78, and o-rings 90 and 92 are secured within the first and second inclined grooves 82 and 84, respectively, of the rotor 78. The rotor 78 is then inserted within the cylindrical bore 76 of the housing 61 and the retaining ring 96 is secured within the third normal groove 87 at the second end 77 of the rotor 78 such that the ring 96 abuts the rear face 102 of the housing 61. The aperture 73 of the lever 72 is aligned with the projection 97 of the rotor 78 and secured thereto by fastener 110. The aperture 73 of the lever 72 and the projection 97 of the rotor 78 preferably have discontinuities, i.e., a non-circular geometry, to prevent inadvertent rotation of the rotor 78 relative to the lever 72. The rotor 78 is thereby journalled within the bore 76 of the housing 61 between the retaining ring 96 and the rotor flange 98 and is rotatable therein by the lever 72.

The height control valve 50 is secured to the frame 54 of the vehicle in any conventional manner, such as bolts 55 as shown in FIG. 2. The lever 72 is pivotally secured to the linkage 74, which is, in turn, pivotally secured to the axle support 56. The height control valve 50 is connected to the air supply 58 and the air spring 52 as described above. In operation, the height control valve 50 has three distinct positions referred to as neutral (off), exhaust, and supply positions as will be further described herein.

The operation of the height control valve 50 is described in FIGS. 4–9, wherein FIGS. 4–5, 6–7 and 8–9 show the height control valve 50 in the neutral, exhaust and supply position, respectively. It should be noted that a projection of the location of the exhaust port 70 is illustrated in phantom lines in FIGS. 5, 7 and 9 though it would normally not be seen in a view having the cross-sectional arrangement of these figures. The location of the exhaust port 70 is important to show in these figures to illustrate the relative movement of the o-rings 90, 92 with respect to the supply, air spring and exhaust ports 62, 66 and 70, respectively, in a manner according to the invention.

Figure 5:
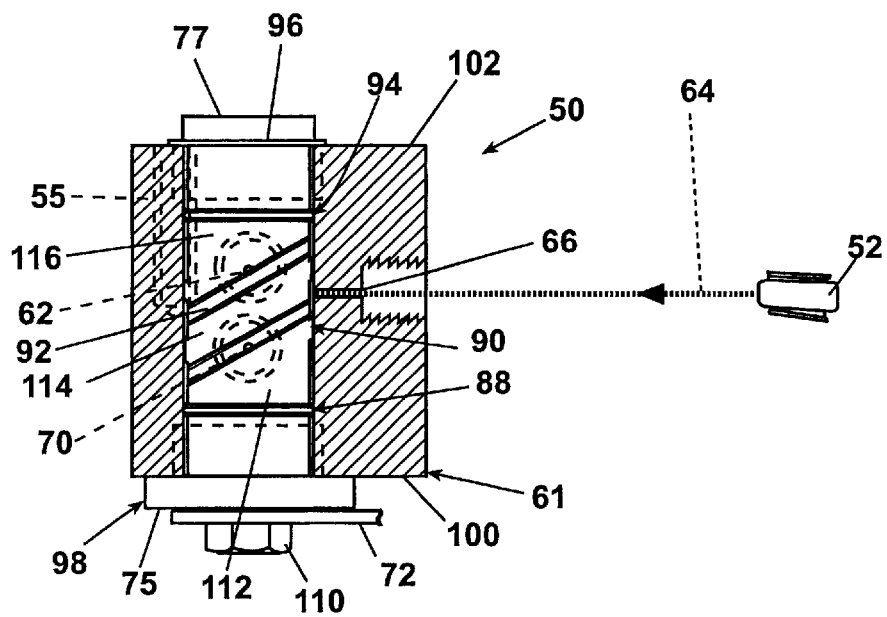
FIG. 5 is a cross-sectional view of the interior of the height control valve taken along lines 5—5 of FIG. 4 in the neutral position showing the height control valve comprising a housing provided with a rotor which has a pair of o-rings defining chambers for selectively interconnecting an air spring with a supply port and an exhaust port therein.
Figure 4:
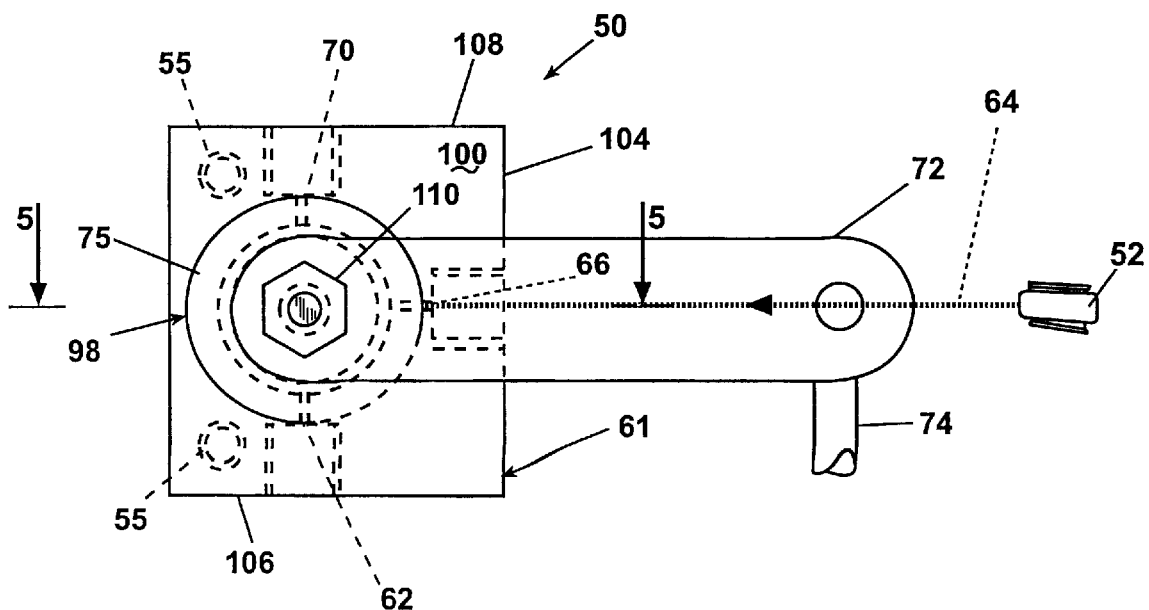
FIG. 4 is a side elevational view of the height control valve of FIGS. 2 and 3, showing a lever mounted thereto in a neutral position whereby the inflation of the air spring remains constant.

FIGS. 4 and 5 show the height control valve 50 in the neutral position corresponding to the frame 54 at a desired or "design" height with respect to the axle support 56 and the lever 72 in a substantially horizontal position with respect to the surface supporting the travel of the vehicle. As best shown in FIG. 5, in the neutral position, the supply port 62 and the exhaust port 70 are each sealed from fluid communication with the air spring port 66, and with each other. The exhaust port 70 is isolated within the first annular gap 112 between the o-ring 88 in the first normal groove 80 and the o-ring 90 in the first inclined groove 82. The air spring port 66 is isolated within the second annular gap 114 between the o-rings 90 and 92 in the first and second inclined grooves 82 and 84, respectively. The supply port 62 is isolated within the third annular gap 116 between the o-ring 92 in the second inclined groove 84 and the o-ring 94 in the second normal groove 86. Thus, in the neutral position, no airflow occurs and the vehicle maintains the operating distance between the frame 54 and the axle support 56.

Figure 7:
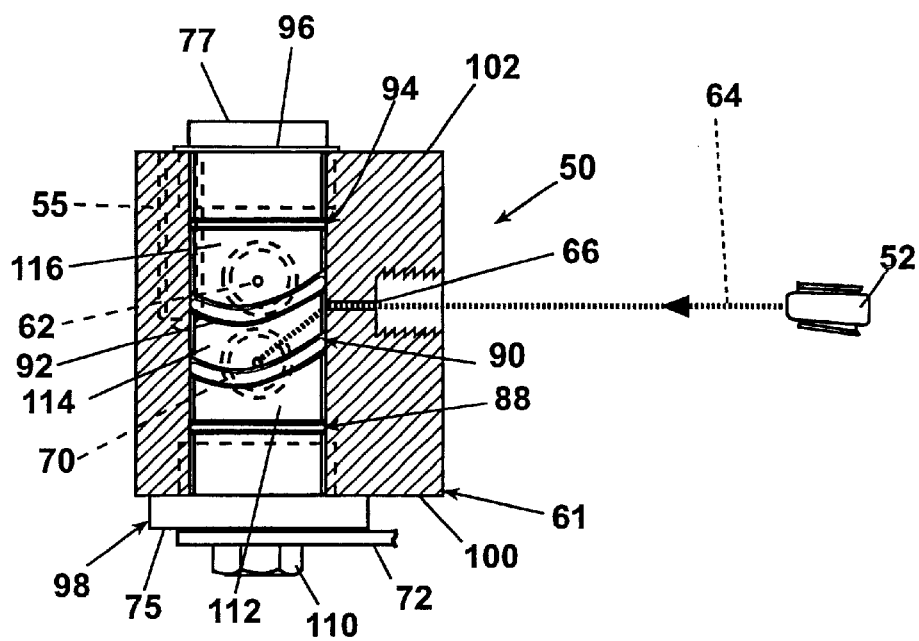
FIG. 7 is a cross-sectional view taken along lines 7—7 of FIG. 6 showing the interior of the height control valve in the first actuated position whereby the air spring port is fluidly interconnected with the exhaust port for exhausting air from the air spring.
Figure 6:
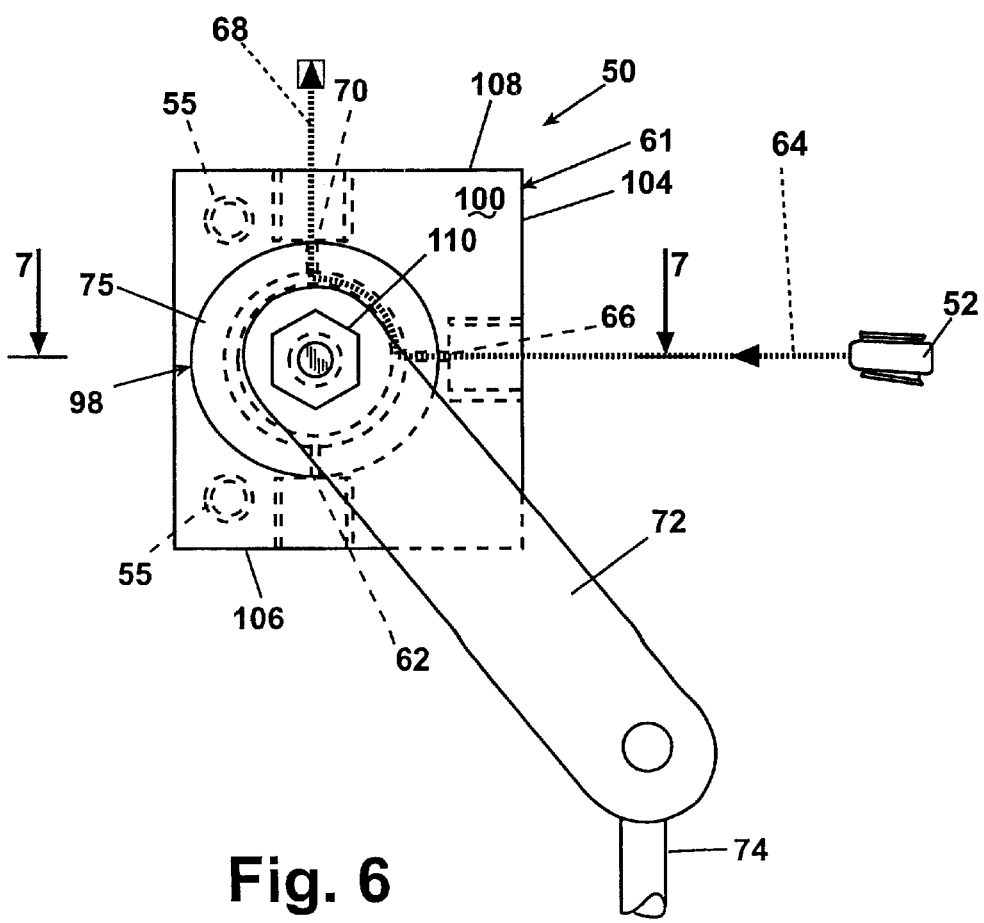
FIG. 6 is a side elevational view showing the lever in a first actuated position whereby the air spring port is interconnected with the exhaust port in the housing of the height control valve.

FIGS. 6 and 7 show the height control valve 50 in the exhaust position corresponding to the frame 54 above the desired or design height from the axle support 56 and the lever 72 pivoted downwardly with respect to the surface supporting the travel of the vehicle. As best shown in FIG. 7, in the exhaust position, the rotation of the rotor 78 by the pivoting of the lever 72 has shifted the second annular gap 114 relative to the ports 66 and 70 so that the air spring port 66 communicates with the exhaust port 70 therein between the o-rings 90 and 92 in the first and second inclined grooves 82 and 84, respectively. The supply port 62 remains isolated within the third annular gap 116 between the o-ring 92 in the second inclined groove 84 and the o-ring 94 in the second normal groove 86. Air is exhausted from the air spring 52 sufficiently to restore the frame 54 to the operating distance relative to the axle support 56 and to return the height control valve 50 to the neutral position shown in FIGS. 4 and 5.

Figure 9:
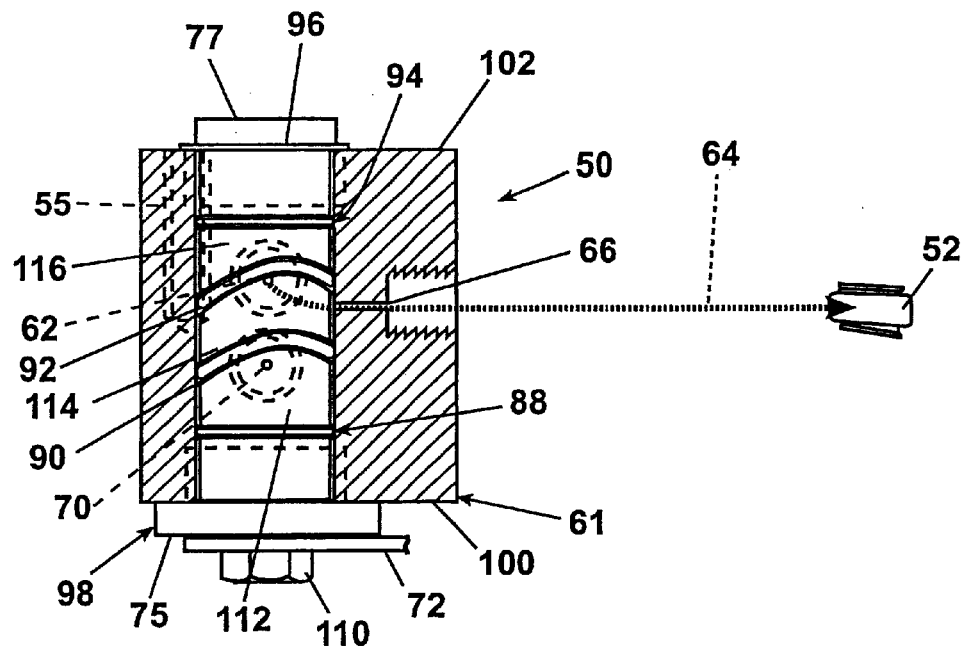
FIG. 9 is a cross-sectional view taken along lines 9—9 of FIG. 8 showing the interior of the height control valve in the second actuated position whereby the air spring port is fluidly interconnected with the supply port for supplying pressurized air to the air spring.
Figure 8:
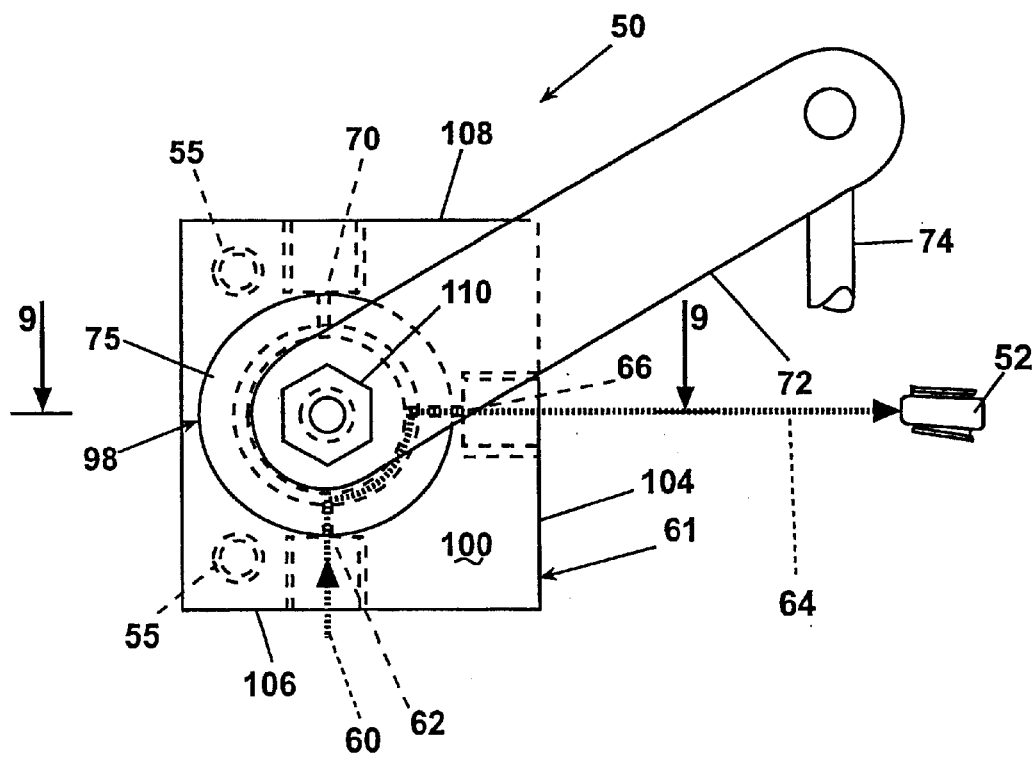
FIG. 8 is a side elevational view showing the lever in a second actuated position whereby the air spring port is interconnected with the supply port in the housing of the height control valve.

FIGS. 8 and 9 show the height control valve 50 in the supply position corresponding to the frame 54 below the desired or "design" height with respect to the axle support 56 and the lever 72 pivoted upwardly with respect to the surface supporting the travel of the vehicle. As best shown in FIG. 9, in the supply position, the rotation of the rotor 78 by the pivoting of the lever 72 has shifted the second annular gap 114 relative to the ports 66 and 62 so that the air spring port 66 communicates with the supply port 62 therein between the o-rings 90 and 92 in the first and second inclined grooves 82 and 84, respectively. The exhaust port 70 remains isolated within the first annular gap 112 between the o-ring 88 in the first normal groove 80 and the o-ring 90 in the first inclined groove 82. Air is supplied to the air spring 52 sufficiently to restore the frame 54 to the operating distance relative to the axle support 56 and to return the height control valve 50 to the neutral position shown in FIGS. 4 and 5.

The relative distance of the frame 54 and the axle support 56 determines in which of the three positions the height control valve 50 is placed. Assuming that the initial position is the neutral position shown in FIGS. 4 and 5, the distance between the frame 54 and the axle support 56 becoming greater than the normal operating distance due to the removal of a sufficient amount of weight, for example, rotates the rotor 78 and causes the height control valve 50 to be placed in the exhaust position, as shown in FIGS. 6 and 7. Air is exhausted from the air spring 52 until the desired operating distance is restored and the height control valve 50 returns to the neutral position of FIGS. 4 and 5. Conversely, the distance between the frame 54 and the axle support 56 becoming less than the normal operating distance due to the addition of a sufficient amount of weight, for example, rotates the rotor 78 and causes the height control valve 50 to be placed in the supply position, as shown in FIGS. 8 and 9. Air will be supplied to the air spring 52 until the operating distance is restored and the height control valve 50 returns to the neutral position of FIGS. 4 and 5.

Spacing and location of the supply and exhaust ports 62 and 70, respectively, can be selected to control the amount of rotation of the rotor 78 that can occur with no air entering or exhausting from the air spring port 66. This degree of permissible rotation without actuating the height control valve 50 is referred to as the "dead band" for the valve 50 and is preferably optimally selected to provide smooth actuation of the valve 50 and to prevent inadvertent actuation thereof due to small movements of the axle support 56 relative to the frame 54. The characteristic flow rate of the valve can vary from a binary on/off response to a more throttled behavior depending upon the shape and location of the supply, air spring, and exhaust ports and upon the inclination and curvature of the o-rings 90 and 92 in the first and second inclined grooves 82 and 84, respectively.

Although the height control valve 50 is shown regulating the ride height of a vehicle frame relative to its axles, the height control valve 50 can be used in any suitable application to maintain the pressure in a pneumatic spring based upon the movement of one member relative to another. For example, in a passenger cab supported on a vehicle frame by air springs, the height control valve 50 can be used in a similar fashion to control the height of the cab relative to the frame.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. A trailing arm suspension comprising a frame bracket adapted to be mounted to a vehicle frame, a trailing arm pivotally mounted to the frame bracket, and an air spring mounted on the trailing arm and adapted to be mounted to the underside of the vehicle frame, a height control valve adapted to be fluidly interconnected to a source of pressurized air and to the air spring, and having an arm adapted to be connected to the trailing arm to control the flow of pressurized air to the air spring and the exhaust of pressurized air therefrom in response to pivotal movement of the trailing arm with respect to the vehicle frame, the height control valve comprising:

a housing having a cylindrical bore, a supply port, an exhaust port and an air spring port each of which extends through the housing and fluidly communicates with the bore;

a rotor rotatably mounted in the bore and interconnected to the arm wherein pivotal movement of the arm rotates the rotor with respect to the housing between first, second and third rotational positions;

a plurality of seals between the rotor and the bore defining a flow passage between the bore and the rotor wherein in the first rotational position, the flow passage isolates the air spring port from both the supply port and the exhaust port, in the second rotational position the flow passage interconnects the air spring port with the supply port, and in the third rotational position the flow passage interconnects the air spring port with the exhaust port.

2. The suspension of claim 1 wherein the flow passage is defined by a pair of circumferential seals.

3. The suspension of claim 2 wherein the rotor has a longitudinal axis and the flow passage is inclined at an acute angle with respect to the longitudinal axis.

4. The suspension of claim 3 wherein the plurality of seals further comprises a circumferential seal located at each end of the rotor.

5. The suspension of claim 4 wherein the plurality of seals comprises o-rings.

6. The suspension of claim 5 wherein the rotor of the height control valve has a plurality of circumferential grooves, each of which receives an o-ring seal.

7. The suspension of claim 1 wherein the rotor has a longitudinal axis and the flow passage is inclined at an acute angle with respect to the longitudinal axis.

8. The suspension of claim 1 wherein the plurality of seals further comprises a circumferential seal located at each end of the rotor.

9. The suspension of claim 1 wherein the plurality of seals comprises o-rings.

10. The suspension of claim 1 wherein the rotor of the height control valve has a plurality of circumferential grooves, each of which receives an o-ring seal.

11. The suspension of claim 1 wherein the plurality of seals is configured so as to provide a dead band for the suspension, wherein small movements of the trailing arm relative to the frame are attenuated.

12. The suspension of claim 1 wherein the configuration of the plurality of seals and the position of the ports cooperate to define a characteristic flow rate of the valve for the flow passage.

13. A height control valve adapted to be mounted to a vehicle frame having a trailing arm suspension and adapted to be fluidly interconnected to a source of pressurized air and to an air spring, and having an arm adapted to be connected to a trailing arm to control the flow of pressurized air to the air spring and the exhaust of pressurized air therefrom in response to pivotal movement of the trailing arm relative to the vehicle frame, the height control valve comprising:

a housing having a cylindrical bore, a supply port, an exhaust port and an air spring port each of which extends through the housing and fluidly communicates with the bore;

a rotor rotatably mounted in the bore and interconnected to the arm wherein pivotal movement of the arm rotates the rotor with respect to the housing between first, second and third rotational ranges;

a plurality of seals between the rotor and the bore defining a flow passage between the bore and the rotor wherein in the first rotational range, the flow passage isolates the air spring port from both the supply port and the exhaust port throughout the first rotational range to prevent inadvertent actuation of the valve in response to small movements of the trailing arm relative to the vehicle frame, in the second rotational range the flow passage interconnects the air spring port with the supply port with a variable flow rate through the second rotational range, and in the third rotational range the flow passage interconnects the air spring port with the exhaust port with a variable flow rate through the third rotational range, wherein the spacing and location of the air spring, supply and exhaust ports and the inclination and curvature of at least one of the plurality of seals are selected to define the angular extent of the first rotational range and the variable flow rates defined by the second and third rotational ranges.

14. The height control valve of claim 13 wherein the flow passage is defined by a pair of circumferential seals.

15. The height control valve of claim 14 wherein the rotor has a longitudinal axis and the flow passage is inclined at an acute angle with respect to the longitudinal axis.

16. The height control valve of claim 15 wherein the plurality of seals further comprises a circumferential seal located at each end of the rotor.

17. The height control valve of claim 16 wherein the plurality of seals comprises o-rings.

18. The height control valve of claim 17 wherein the rotor of the height control valve has a plurality of circumferential grooves, each of which receives an o-ring seal.

19. The height control valve of claim 13 wherein the rotor has a longitudinal axis and the flow passage is inclined at an acute angle with respect to the longitudinal axis.

20. The height control valve of claim 13 wherein the plurality of seals further comprises a circumferential seal located at each end of the rotor.

21. The height control valve of claim 13 wherein the plurality of seals comprises o-rings.

22. The height control valve of claim 13 wherein the rotor of the height control valve has a plurality of circumferential grooves, each of which receives an o-ring seal.

* * * * *